L. A. PALEY.
APPARATUS FOR THE MANUFACTURE OF SOAP.
APPLICATION FILED APR. 1, 1920.
1,413,870.
Patented Apr. 25, 1922.
10 SHEETS—SHEET 1.
Fig. 1.
Fig. 2.
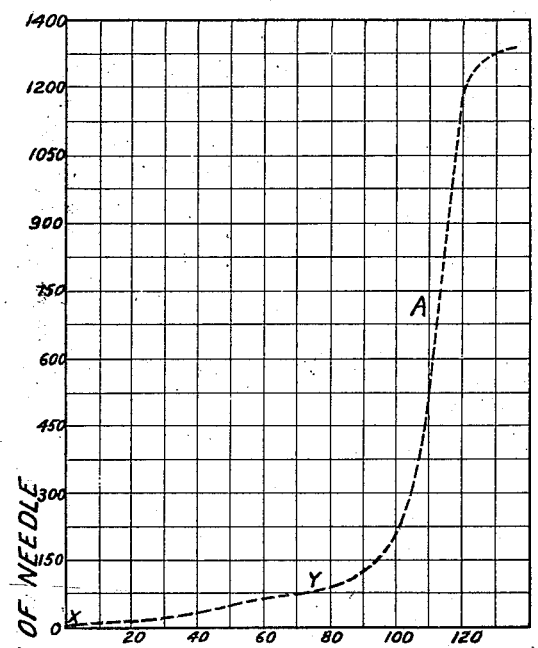
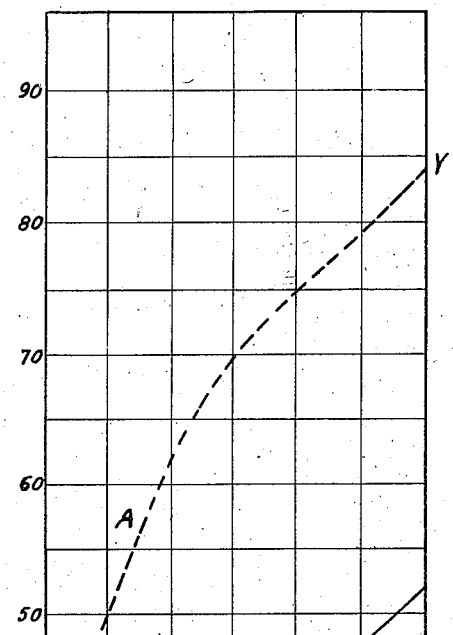
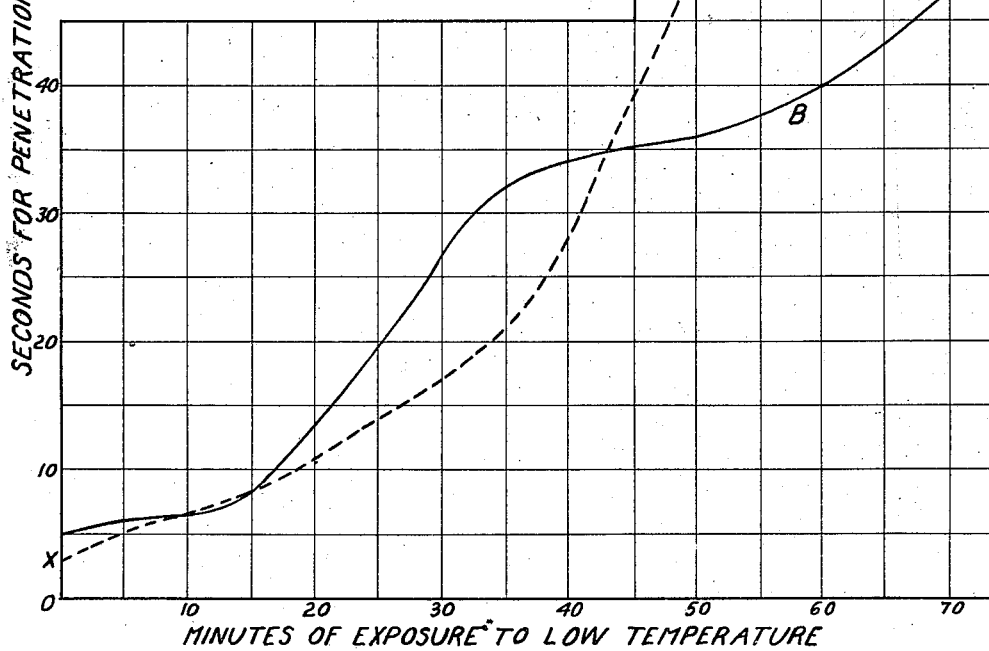
INVENTOR
Lewis A. Paley

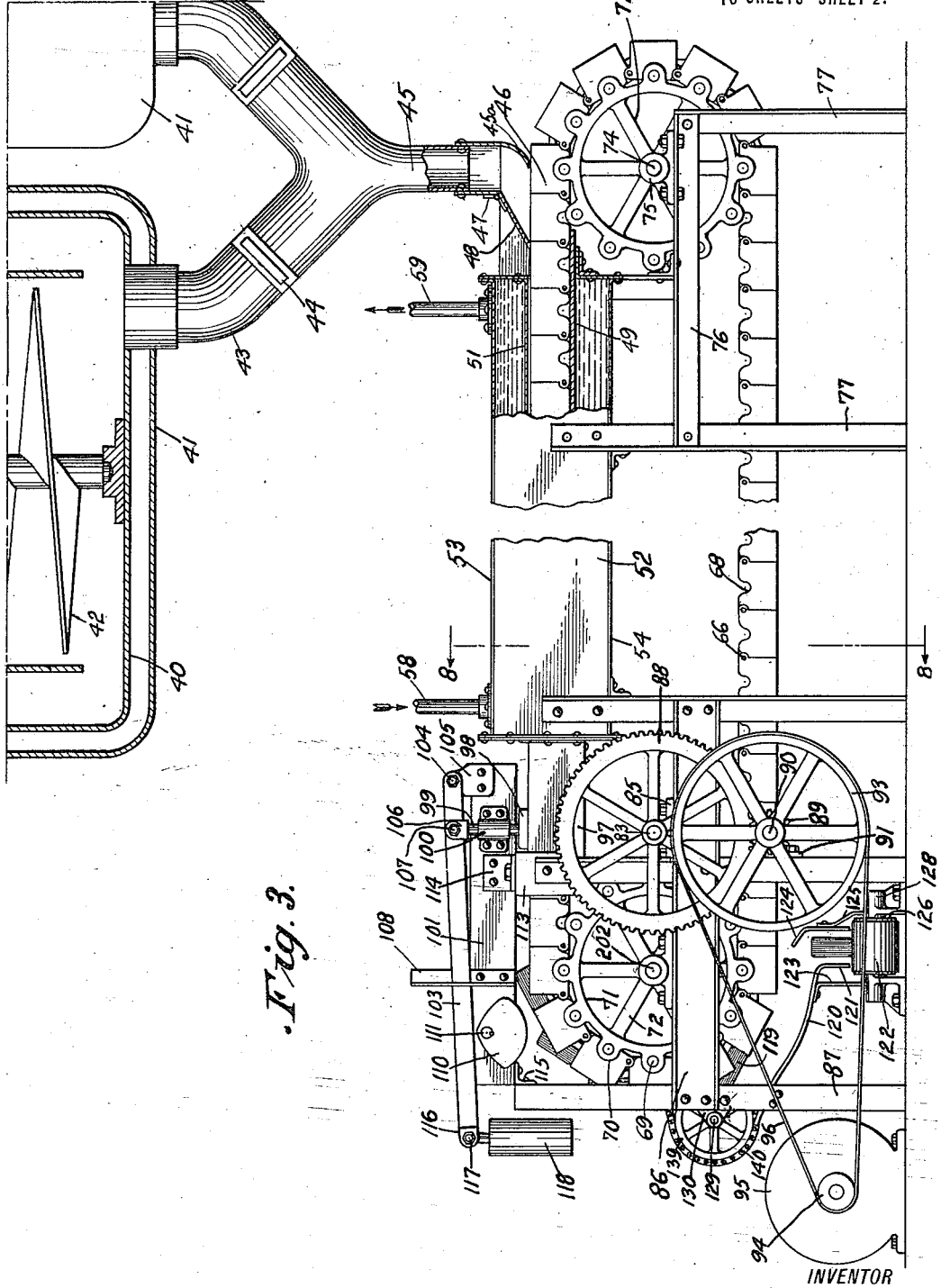

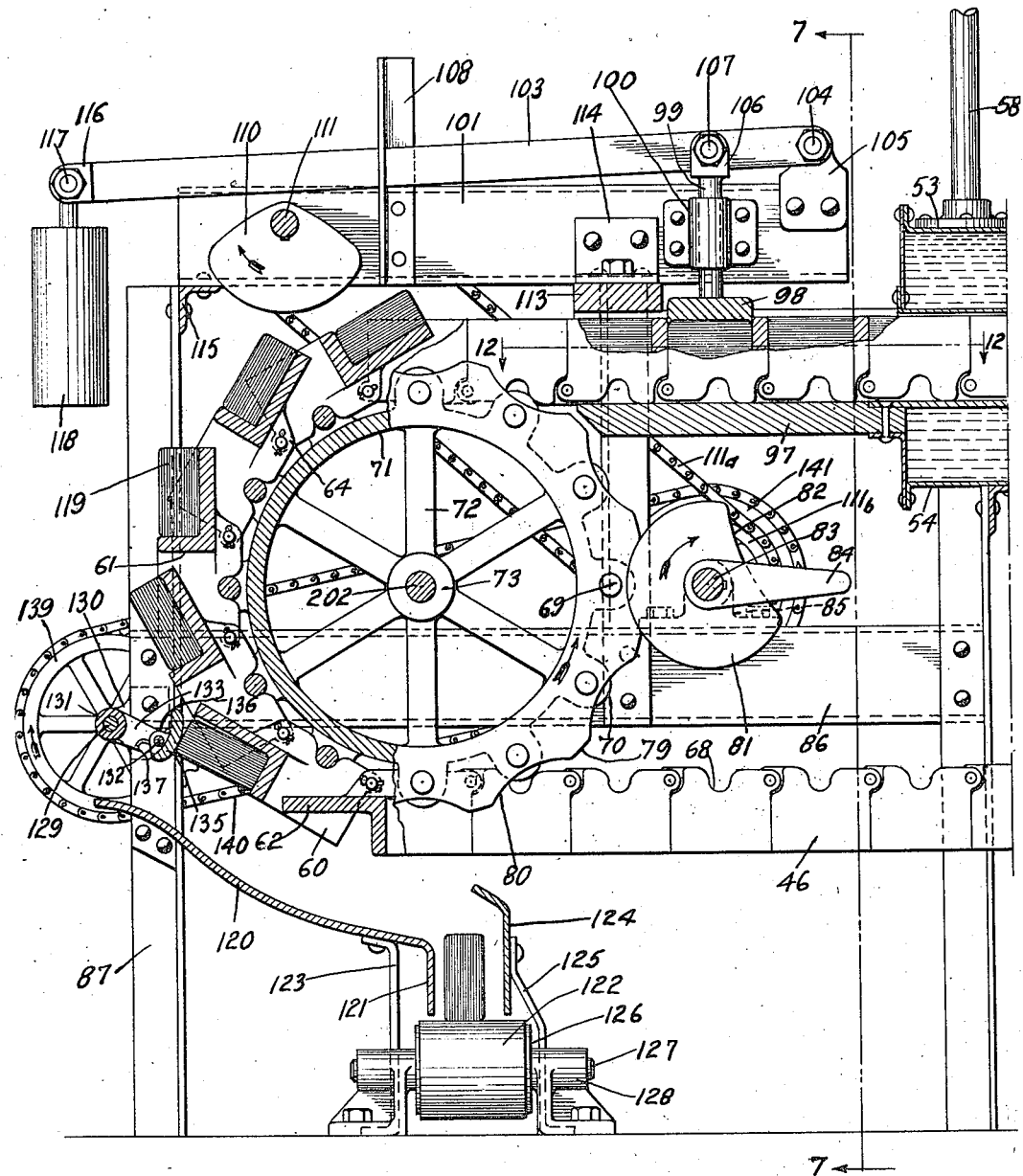

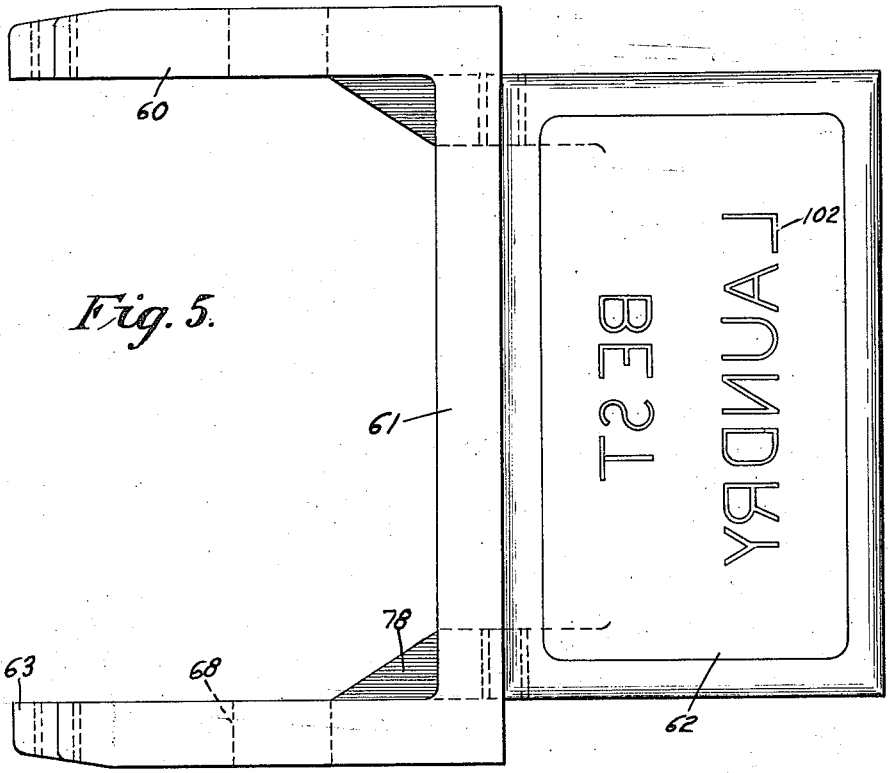
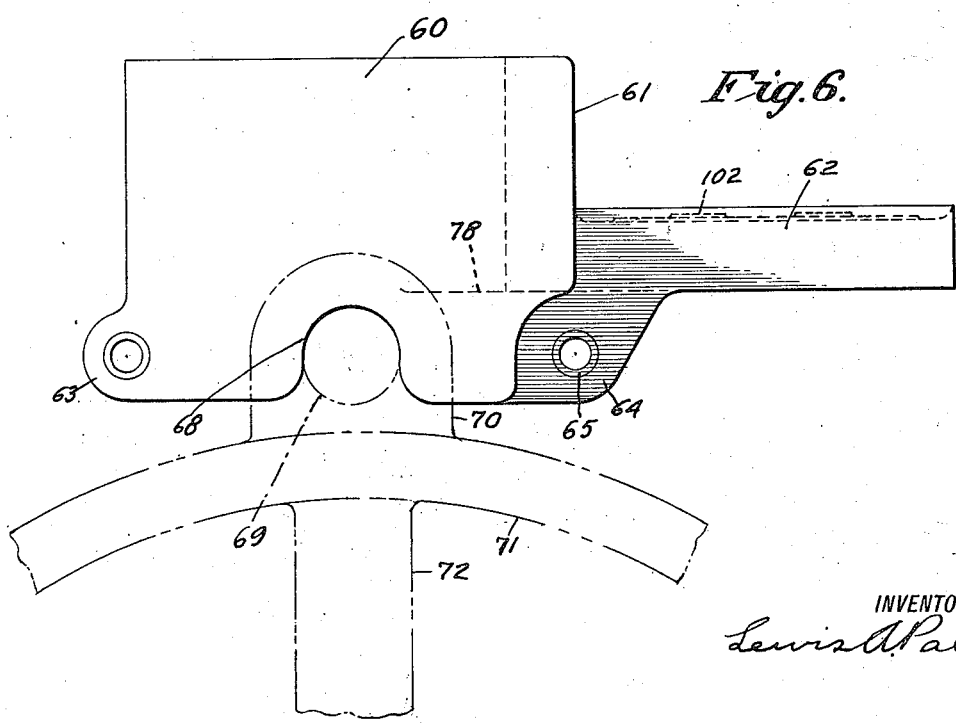

L. A. PALEY.
APPARATUS FOR THE MANUFACTURE OF SOAP.
APPLICATION FILED APR. 1, 1920.
1,413,870.
Patented Apr. 25, 1922.
10 SHEETS—SHEET 5.
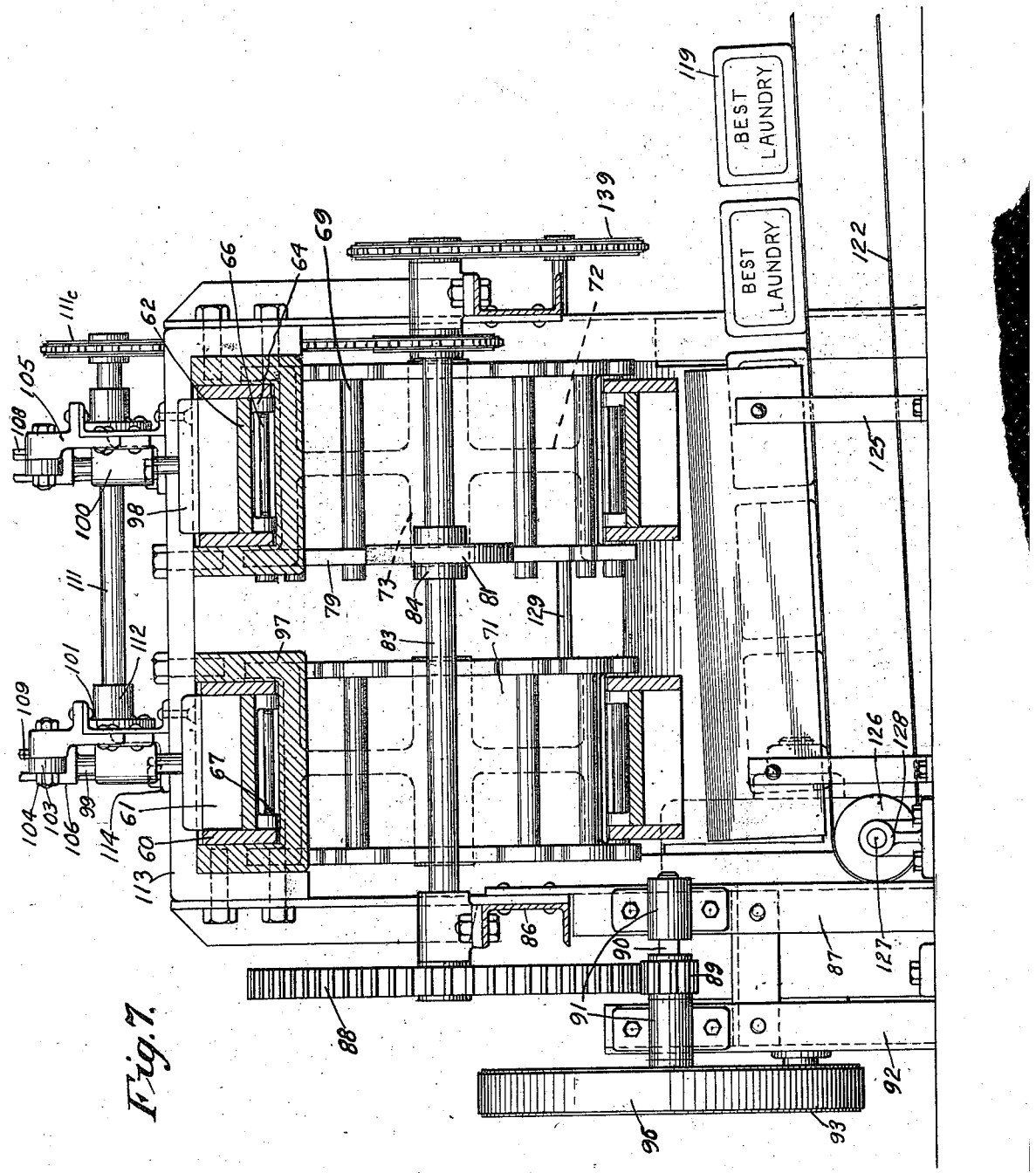
INVENTOR
Lewis A. Paley L. A. PALEY.
APPARATUS FOR THE MANUFACTURE OF SOAP.
APPLICATION FILED APR. 1, 1920.
1,413,870.
Patented Apr. 25, 1922.
10 SHEETS—SHEET 6.
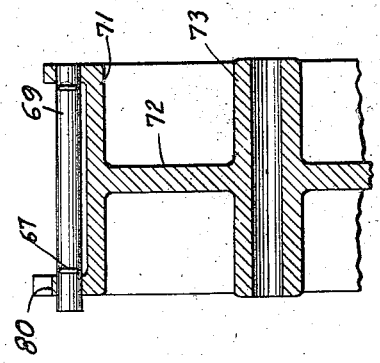
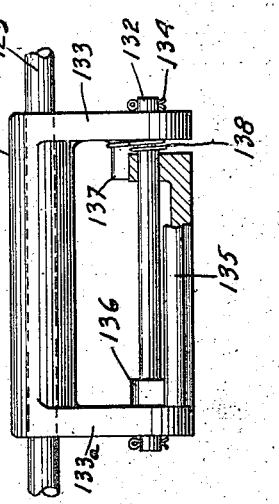
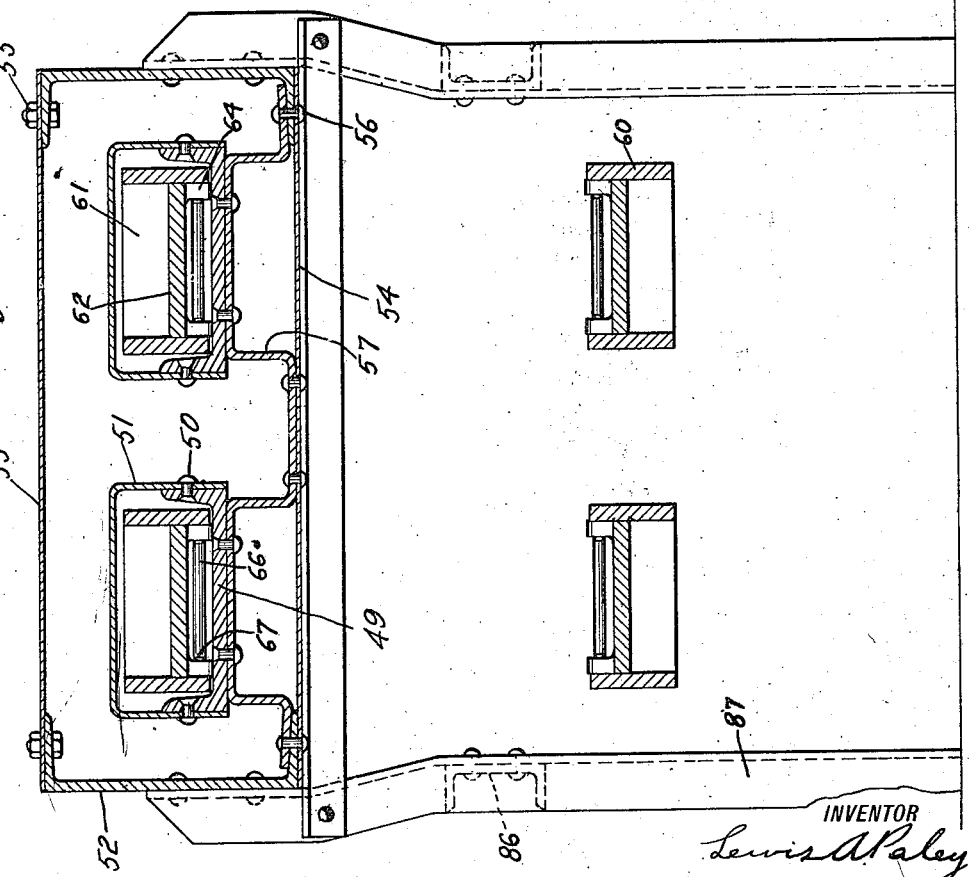
INVENTOR
Lewis A. Paley L. A. PALEY.
APPARATUS FOR THE MANUFACTURE OF SOAP.
APPLICATION FILED APR. 1, 1920.

1,413,870.

Patented Apr. 25, 1922.
30 SHEETS—SHEET 7.

INVENTOR
Lewis A. Paley

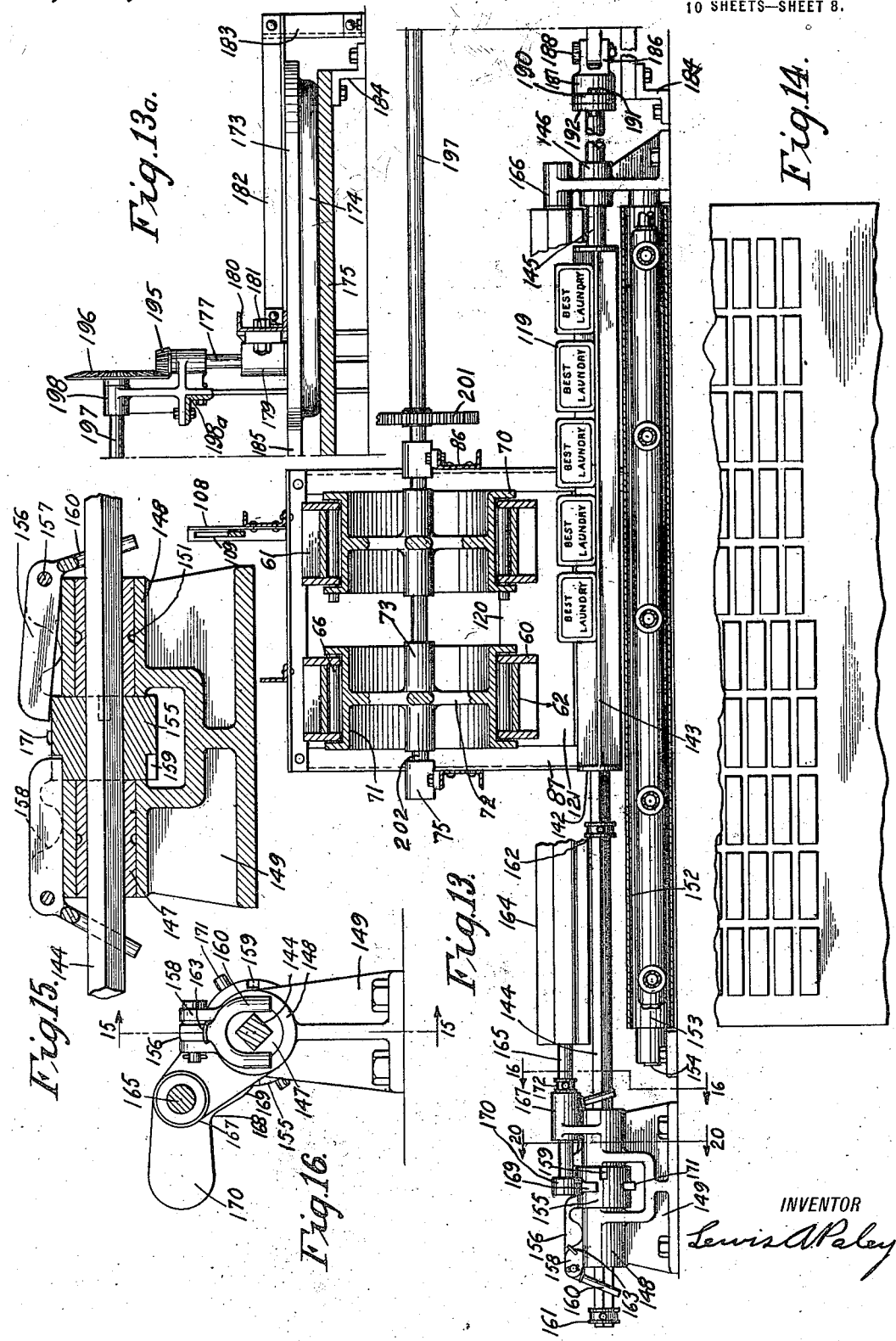

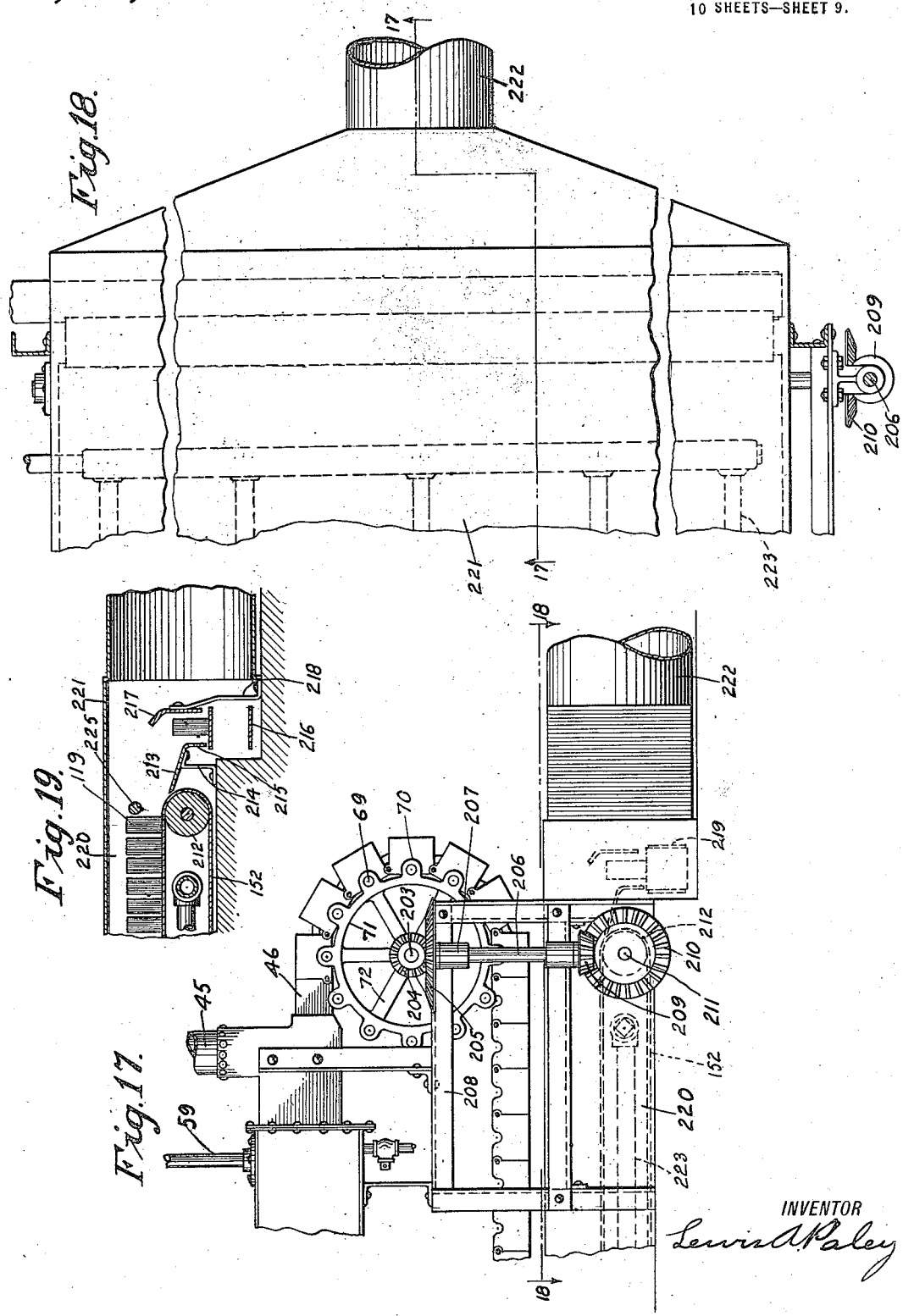

L. A. PALEY.
APPARATUS FOR THE MANUFACTURE OF SOAP.
APPLICATION FILED APR. 1, 1920.
1,413,870.
Patented Apr. 25, 1922.
10 SHEETS—SHEET 10.
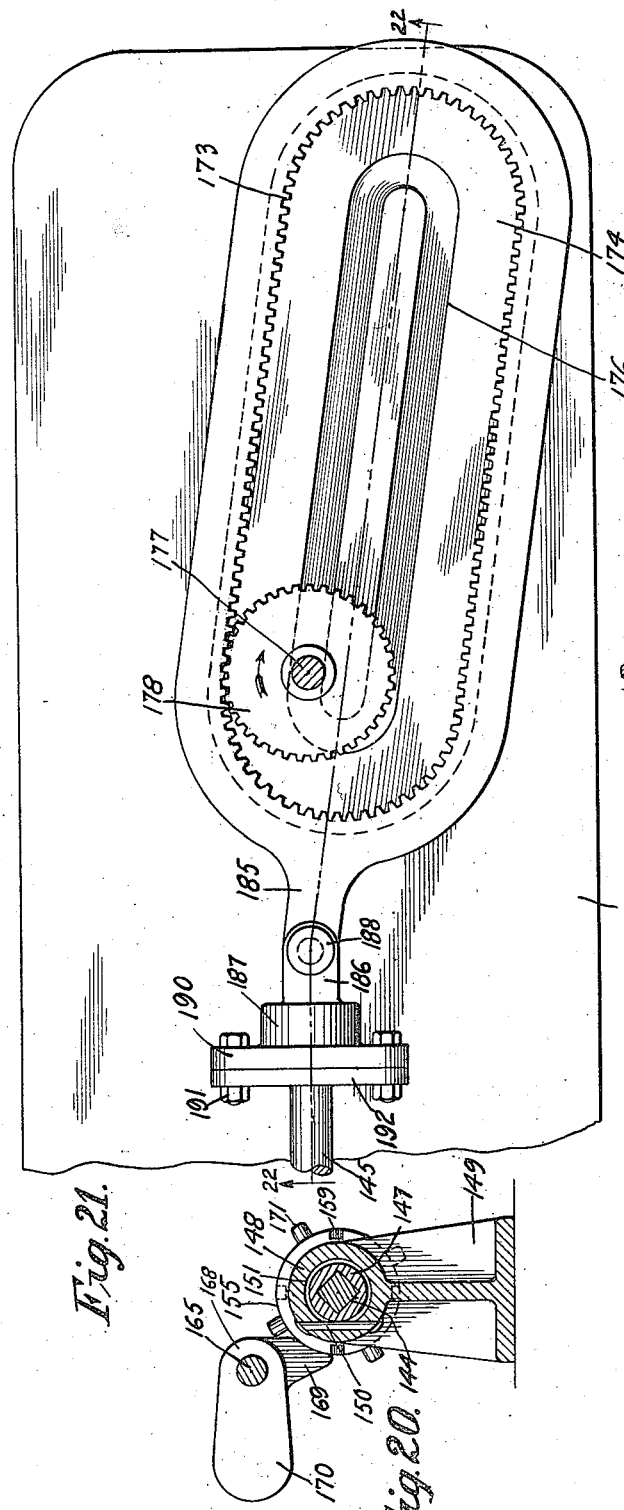
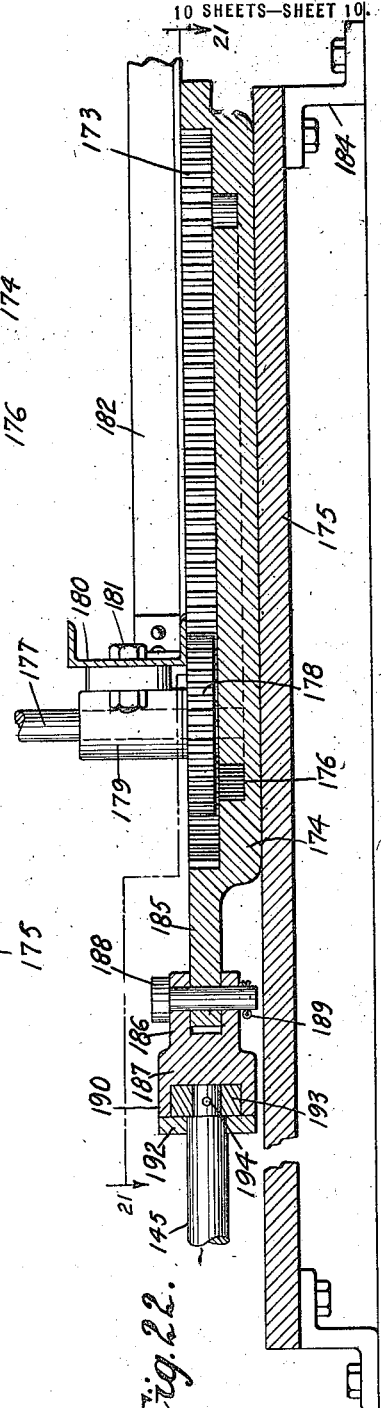
INVENTOR
Lewis A. Paley

UNITED STATES PATENT OFFICE.

LEWIS A. PALEY, OF MANHASSET, NEW YORK, ASSIGNOR TO PALEY ENGINEERING COMPANY, OF NEW YORK, N. Y., A CORPORATION OF DELAWARE.

APPARATUS FOR THE MANUFACTURE OF SOAP.

1,413,870.  Specification of Letters Patent.  Patented Apr. 25, 1922.

Application filed April 1, 1920. Serial No. 370,441.

*To all whom it may concern:*

Be it known that I, LEWIS A. PALEY, a citizen of the United States, and a resident of Manhasset, county of Nassau, and State of New York, have invented a new and Improved Apparatus for the Manufacture of Soap, of which the following is a full, clear, and exact description.

This invention relates to a process for the manufacture of soap, paraffin, wax, stearin, gelatin, cocoa butter and other substances which are liquid when hot and solidify on cooling, and has reference more particularly to a process in which the substance is artificially cooled until solidified, pressed, and wrapped while in a solid state.

The process described herein is described and claimed in my co-pending application Ser. No. 520,624, filed Dec. 7, 1921, which is a division of this application.

It further relates to a machine designed to carry out the above process automatically and continuously.

As practiced at present, soap is prepared in the kettle by heating the mixture of fats and alkali by steam until hydrolysis takes place and the resulting soap is in a semifluid condition. The soap is then run from the kettle into the "crutcher" which is an apparatus for mechanically mixing the soap with various filling agents, such as soda ash, sodium silicate, borax, talc, etc. The "crutcher" is often steam jacketed so that the temperature of the contents may be accurately controlled. After the mixing is complete and the temperature is 140-144° F., the soap is run into a frame which is a box supported on trucks and provided with removable sides. This frame is then pushed by hand into a cooling room where it is allowed to cool for from four to six days. After the soap is cooled, the frame is "stripped," i. e., the sides are removed by hand, and the truck carrying the big cake of soap is pushed through a slabbing machine which cuts it into horizontal slabs. The slabs are then lifted by hand onto a cutting machine where they are cut into cakes and placed on trays which are put on drying racks and the soap is allowed to dry for one to eight days. The purpose of the drying is to form a thin "skin" of hard, dry soap on the outside of the bars so that the bars may be later pressed and stamped. This has been considered essential, since the bars of soap which leave the cutting machine are sticky, and if an attempt was made to press the soap in this condition it would adhere to the dies and would render the pressing and stamping impracticable. During the drying process, the bars of soap which originally contained about 30 to 35% moisture, lose about 3 to 5% moisture, all of the water being expelled from the surface of the bar, so as to form the "skin," while the inner part of the bar still contains the original 30 to 35% water. The bars of soap are usually placed on an endless belt from the drying trays and this belt carries the soap to an automatic stamping machine which stamps the inscription on the bar of soap and presses it into compact form. From the stamping machine the bars of soap are usually carried by an endless belt to an automatic wrapping machine which wraps the soap in the paper wrappers, after which it is packed in boxes by hand, ready for shipment.

Thus the manufacturing process requires at least three weeks to prepare the soap for sale after it leaves the soap crutcher and includes the following steps, (*a*) framing, (*b*) stripping, (*c*) slabbing, (*d*) cutting, (*e*) drying, (*f*) stamping, and (*g*) wrapping, each step of which requires considerable time and a large amount of labor, the cost of which is daily becoming more expensive. In the frame the soap also segregates and a freshly cut surface of a finished bar of soap contains heterogeneous streaks, due to the large amount of filling material usually present in ordinary laundry soap. A large amount of scrap soap is formed during the slabbing and cutting steps and this scrap soap must be remelted and reworked at an additional expense. Manifestly, the entire manufacturing process is very inefficient, a large amount of capital is tied up in soap stock during the process, and the process is intermittent, thus making a product which is not uniform in quality.

Numerous attempts have been made to shorten this process which are mainly attempts to cool the soap by artificial means. In one method, an attempt is made to force the hot soap under pressure through an orifice which is artificially cooled, but with soap containing a large percentage of filling materials, such as laundry soaps, the structure of the soap is destroyed by passing through the orifice when nearly cold and hard, and the resulting product does not have sufficient cohesion. Other devices for cooling the soap are of complicated mechanical construction which makes a high cost of installation. Still other methods attempt to cool large masses of hot soap artificially, but owing to the very low thermal conductivity of soap, a long time is required in the cooling process. All of the processes depend upon drying the soap after cooling in order to form a "skin" on the outside of the bar suitable for stamping, and all attempts have been only partially successful or not at all.

An object of this invention therefore is to provide a process for the manufacture of soap which will greatly decrease the time necessary in its preparation for sale.

Another object of the invention is to provide a process in which segregation of the filling materials is prevented and the quality of the soap is greatly improved.

Another object of the invention is to provide a process of the class indicated which will be continuous thus insuring a product of uniform and high quality.

Another object of the invention is to provide an apparatus for carrying out this process which will be automatic, thus greatly decreasing the cost of labor in the manufacture of soap, will not cause the formation of scrap soap, said apparatus being adapted to cool the soap artificially and press it without necessitating the intermediate steps of framing, stripping, slabbing, cutting and drying.

Another object of this invention is to provide a machine for cooling soap in small masses so as to greatly reduce the time of cooling.

A further object of this invention is to provide a machine of the class indicated, which may be designed with small capacity, but may also be designed with a very large capacity without materially increasing the number of operating parts required by the smaller machines.

A still further object of the invention is to provide an apparatus in which a continuous and inexpensive mechanism is provided for drying special types of soaps.

Reference is to be had to the accompanying drawings forming a part of this specification in which it is understood that the drawings illustrate only one form of the invention and in which Figure 1 is a graphical curve showing the hardening due to super-cooling of a typical brand of laundry soap.

Figure 2 is a portion $x$—$y$ of the curve shown in Figure 1 on a large scale, together with a similar curve for another brand of laundry soap.

Figure 3 is a side elevation of the improved machine for carrying out the soap making process, with parts broken away to disclose the construction.

Figure 4 is a central sectional view through the stamping end of the machine with parts broken away to disclose the construction.

Figure 5 is a top view of one of the buckets or molds of which the bucket chain is composed.

Figure 6 is a side elevation of a bucket.

Figure 7 is a sectional view through the machine on the line 7—7 of Figure 4.

Figure 8 is a section through the machine on the line 8—8 of Figure 3.

Figure 9 is a fragmentary central sectional view through a driving bucket sprocket wheel.

Figure 10 is a plan view, partly in section, of the device which extracts the cakes of soap from the buckets.

Figure 13 is a sectional view through the machine on the line 13—13 of Figure 11.

Figure 13$^a$ is a continuation of Figure 13.

Figure 14 is a fragmentary plan view of the drying belt showing the arrangement of the cakes of soap as they are deposited by the distributing mechanism.

Figure 15 is a central sectional view through the tripping mechanism being taken on the line 15—15 of Figure 16.

Figure 16 is a sectional view through the tripping mechanism on the line 16—16 of Figure 13.

Figure 11:
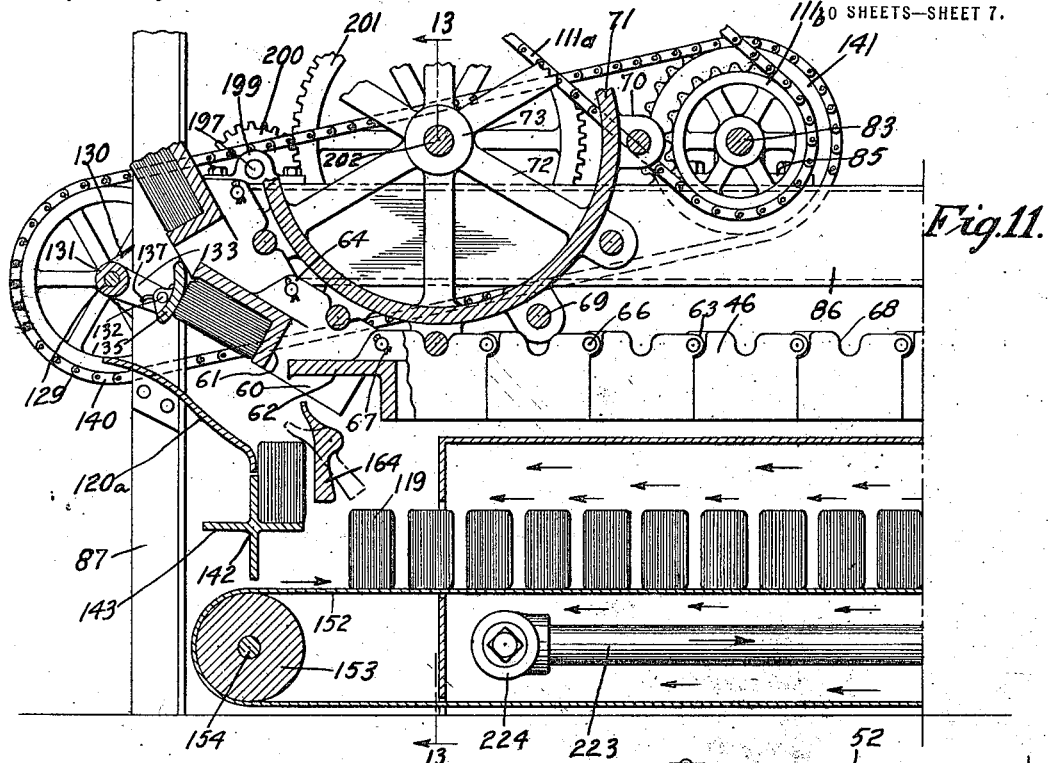
Figure 11 is a fragmentary sectional view of the stamping end of the machine in which a drying mechanism is provided.
Figure 12:
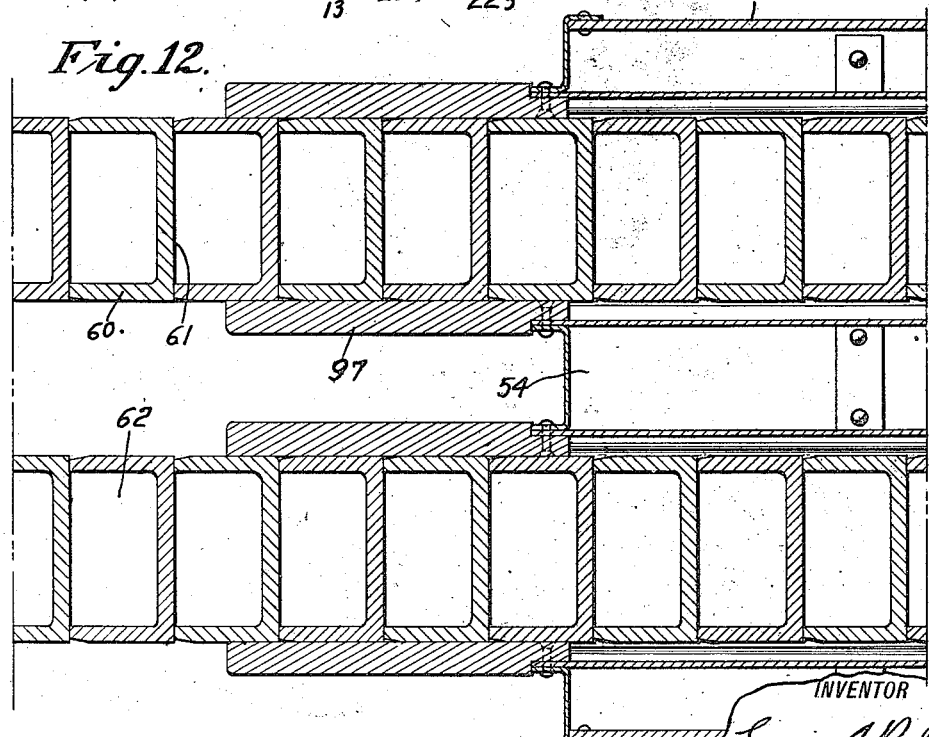
Figure 12 is a section through the machine on the line 12—12 of Figure 4.

Figure 17 is a fragmentary side elevation of the delivery end of the machine shown in Figure 11.

Figure 18 is a sectional plan view of the delivery end of the drying chamber, being taken on the line 18—18 of Figure 17.

Figure 19 is a fragmentary sectional view through the delivery end of the drying chamber and belt being taken on the line 17—17 of Figure 18.

Figure 20 is a sectional view through the tripping mechanism on the line 20—20 of Figure 13.

Figure 21 is a sectional plan view of the reciprocating gear which operates the distributer, being taken on the line 21—21 of Figure 22.

Figure 22 is a section through the reciprocating gear on the line 22—22 of Figure 21.

In obtaining the data on which the curves shown in Figures 1 and 2 were based, a needle 2.5 centimeters long was provided with a head which weighed 150 grams. A cake of commercial laundry soap was cut in two, and this cake was subjected to a temperature of —7° C. At frequent intervals the needle was suspended so as to just touch the freshly cut surface of the soap and was then released, the time necessary for the needle to completely sink into the soap being observed in seconds. In the graphs, the minutes of exposure to low temperature were made the abscissa and the seconds necessary for the complete penetration of the needle were made the ordinates. The resulting curve indicates clearly the effect of the super-cooling on the hardness of soap. As shown by the curve, the principle hardening effect was obtained with the soap while cooling from 80–120 minutes and the maximum hardness was obtained when the soap had cooled for two hours, which shows that the soap has a very low thermal conductivity. In Figure 2 the portion $x$—$y$ of the curve A, shown in Figure 1 is greatly enlarged and is compared to the curve B of another typical example of laundry soap. It was observed that the sticky character of the freshly cut surface of commercial laundry soap at the ordinary temperature of about 25° C. was completely lost after three minutes of exposure to the temperature of —7° C., and that the soap became so hard after cooling for two hours that a cake might be dropped on a hard surface from a considerable height without being appreciably damaged. Thus the formation of a "skin" by drying which has always been considered necessary for preparing the soap for stamping may be completely eliminated if the soap is stamped while in a super-cooled state so that its sticky character is eliminated.

Referring to the remaining drawings of the machine in which like numerals represent like parts in the several views, 40 indicates a crutcher which is preferably surrounded by a steam jacket 41 so that steam or cooling water may be passed around said crutcher, thus controlling the temperature of the contents. The soap from the kettle, not shown, is run into this crutcher and any suitable stirring mechanism, such as a screw 42, mixes the soap thoroughly with various filling agents. I preferably provide a pair of crutchers for each cooling machine so that when one crutcher has become empty, the contents of the remaining crutcher may be run into the endless chain of buckets to be hereinafter described, while the first crutcher is being re-filled and its contents mixed. The two crutchers are connected with each other by means of a Y-shaped pipe 43, each arm of which is provided with a valve 44, so that one valve may be closed while the hot liquid soap is running out of the other crutcher. The Y-shaped pipe 43 terminates at its lower end in one or more pipes 45, each of which empties directly into an endless chain of molds or buckets collectively designated by the numeral 46. The rear side 45ª of the lower end of the pipe 45 is curved forwardly so as to direct the stream of soap into the chain of buckets 46 in the direction of motion of said chain, and the front side of the pipe 45 has hinged to it by means of a spring hinge 47, a plate 48. This plate rests obliquely on the top of the bucket chain 46, so that the soap is pressed into the buckets and scraped level while the spring hinge allows a slight movement in said plate to allow for slight inequalities in the upper surfaces of the buckets.

After being filled with the hot liquid soap the bucket chain 46 passes onto any supporting member, such as the channel strip 49 to which is secured, by means of rivets 50, a cooling chamber 51, which surrounds said bucket chain 46. This chamber 51 is surrounded in turn by an outer chamber which may be constructed of two side channel strips 52, a top plate 53, and a bottom plate 54, secured to the flanges of said channel strips by means of bolts 55 and rivets 56, respectively. The channel strips 49 are suitably supported inside the outer chamber by means of any type of brackets 57 riveted to said channel strips 49 and to said bottom plate 54. Any cooling medium, such as a solution of sodium or calcium chloride from a refrigerating apparatus, not shown, is introduced into the outer chamber by means of an intake pipe 58 and is removed by means of an outlet pipe 59, said pipes being secured to the upper plate 53. The direction of flow of the cooling medium is preferably countercurrent to the direction of motion of the bucket chain 46 so that a substantially constant difference of temperature is maintained throughout the length of the cooling chamber between the cooling medium and the soap, thus insuring a high cooling efficiency. Thus the soap is cooled, solidified and hardened as it passes through the cooling chamber 51 and may be then stamped and discharged from the buckets.

The buckets of the chain 46 are preferably constructed so that the hand cake of soap (as distinguished from a larger cake of soap in the claims), is positioned with its broadest surface horizontal and to accomplish this the buckets are constructed with end walls 60 connected on each end of said walls, with a transverse, integral, side walls 61. Each bucket is bottomless but a bottom 62 for the adjacent bucket is formed integral on the lower side of the wall 61 opposite the walls 60. This bottom has exactly the length and width of the hand cake of soap which it is desired to form and this bottom is also of such length as to slidably fit between the walls 60 of the adjacent bucket. It is thus seen that the soap molds form a series or chain of interlocking buckets. The buckets are pivotally secured together by means of lugs 63 which are formed on the lower front side of the wall 60 so as to engage lugs 64 on the adjacent bucket, which are formed on the lower front side of the bottom 62, so as to also serve as reinforcing means between said bottom and said walls 60 and 61. The entire bucket may be made of any suitable metal, but it is preferred to make it by die casting and sleeves 65 of hard metal are cast into the lugs 63 and 64, which serve as bearings for pivot pins 66 held in place by means of split pins 67 engaging the inner surface of the lugs 64. Semi-circular recesses 68 are formed in the lower side of the walls 60, so as to receive rods 69, which are supported in outstanding ears 70, formed on each side of a rim 71 of a sprocket wheel having spokes 72 and a hub 73. The hub 73 is secured to a shaft 74, and said shaft is journaled in suitable bearings 75 which are supported by any suitable horizontal beams 76, which in turn are supported by vertical standards 77. The vertical standards also serve to support the channels 52 to which they are riveted so that the cooling chamber 51 is correctly positioned to receive the endless chain of buckets 46. The lugs 64 of the buckets extend somewhat further downwardly than the lugs 63 and said lugs 64 are provided with stops 78 each of which support one corner of the adjacent bucket bottom 62, so that when the soap, which the bucket contains, is stamped by the mechanism to be hereinafter described, the lug 64, which rests on the channel 49, will take the pressure from the rear side of the adjacent bucket bottom 62 without throwing the pressure on the pins 66. The sprocket wheels are preferably two in number for each chain, one at the crutcher end of the machine and the other at the stamping end of the machine.

The bucket chains may be in any number to handle the output of the crutchers, but for a pair of small crutchers it is preferred to use two bucket chains. It is desired to have the bucket chains 46 moved with an intermittent motion so that at each dwell a cake of soap may be pressed at one place on the chain while at another place a cake of soap may be discharged. The ears 70 on one edge of a sprocket wheel on the stamping end of the machine are modified to form a scalloped flange 79 in which is formed a plurality of semi-circular recesses 80, one adjacent each of the rods 69, and these recesses are adapted to be consecutively engaged by a circular disc 81 which has a clearance segment 82 removed from it. This disc 81 is secured coaxially to a shaft 83 and an arm 84 is formed on or secured to said disc adjacent the segment 82. The rods 69 on this sprocket wheel extend beyond the scalloped flange 79 so that as the shaft 83 is rotated, the disc 81 will hold the sprocket wheel accurately in position while it rotates as shown in Figure 4, and when said arm 84 rotates to a position diametrically opposite said position, it will engage the outer end of the adjacent bar 69, thus moving the sprocket wheel and the bucket chain to a position where the disc 81 will engage another recess 80. The shaft 83 is mounted in bearings 85 which are secured to horizontal beams 86 supported by vertical standards 87. Any suitable mechanism may be used for rotating the shaft 83 continuously, such as a spur gear 88 secured to one end of said shaft and engaging a spur pinion 89 secured to a shaft 90, said shaft being rotatably mounted in bearings 91, which are preferably bolted to one of the standards 87 and to an auxiliary vertical standard 92. A pulley 93 may be secured to one end of the shaft 90 which is connected to a pulley 94 of a motor 95, by a belt 96. Thus the mechanism described will give the bucket chain 46 an intermittent motion, and since said chain is driven at the stamping end of the machine, the upper run of the bucket chain will be kept taut, while the lower run of the bucket chain will be somewhat slack.

Preferably, but not necessarily, I provide mechanism for stamping the buckets of soap after they have passed from the cooling chamber 51, which consists of a channel 97 riveted to the end of said cooling chamber and made of heavier material, so as to withstand the stamping pressure and so as to prevent the end walls 60 of the buckets from spreading when under pressure. A die 98 is secured to the lower end of a rod 99 slidably mounted, with its axis vertical, in a bearing 100, which may be riveted to any supporting frame work, such as a channel strip 101. The lower side of the die 98 may be provided with any suitable advertising inscriptions in raised letters and any other suitable advertising inscription 102 may be formed in raised letters on the upper surface of the bucket bottoms 62, so that if the die 98 is reciprocated downwardly into a bucket during a dwell in the motion of the bucket chain 46, the advertising characters will be clearly stamped on both sides of the cake of soap and the soap will be compressed into compact form. Any suitable mechanism may be used for reciprocating the rod 99 in the bearing 100, which may take the form, as shown, of a lever 103, which is pivotally mounted by means of a bolt 104 to a bracket 105 riveted to one end of the channel strip 101. The upper end of the rod 99 is formed into a fork 106 in which the lever 103 is pivotally secured by means of bolt 107. An angle strip 108 is riveted to the channel strip 101, and a slot 109 is formed in the outstanding leg of said angle strip, said lever passing through said slot so that its rocking motion will be guided thereby. The lever 103 is rocked about its pivot 104 by a cam 110 which is secured to a shaft 111 rotatably mounted transversely of the channel strip 101 in bearings 112. The shaft 111 may be rotated by a chain 111ª, leading from a sprocket wheel 111ᵇ on the shaft 83 to a sprocket wheel 111ᶜ secured to the shaft 111. A U-shaped brace 113 is bolted to the edges and sides of the channel 97 and angle clips 114 are riveted to said brace 113 and to the channel strip 101 so as to rigidly secure the latter in position to withstand the strain of the stamping mechanism. One end of the strip 101 may be secured to the vertical standards 87 by a transverse angle strip 115, riveted to said channel strip and to said vertical standards. The end of the lever 103, opposite the pivot 104 is provided with a forked end 116, in which is pivotally suspended, by means of a bolt 117, a weight 118. Thus when the cam 110 is in its lowermost position, as shown in Figure 4, the weight 118 will force the die 98 downwardly by means of the lever 103, and the soap in the bucket will be stamped thereby as well as pressed into the bucket in a compact mass of uniform size regardless of any shrinkage in the soap caused by the cooling.

As the bucket chain 46 leaves the stamping die 98 and passes around the sprocket wheel, the bottom attached to each bucket moves vertically between the sides 60 of the adjacent bucket, carrying with it a cake of soap 119 which is stamped, and hard, due to its super-cooled state. Ordinarily when the bucket is upturned the cake of soap 119 will drop out of the bucket of its own weight and fall on a chute 120, which is secured to the vertical standards 87 and terminates at its lower end in a vertical member 121 positioned directly above an endless belt 122. The lower end of this chute is supported by a bracket 123 riveted thereto. The cakes of soap 119 will usually fall on the chute 120 on their broad side and on sliding down the chute, which is at such an angle as to give a slow motion to said cake of soap, will strike against a shield 124 which is supported in a vertical position, by a bracket 125, directly above the endless belt 122, so that the cake of soap will drop onto the endless belt 122 on edge between the shield 124 and the vertical member 121. The endless belt 122 is mounted on a pulley 126 which in turn is mounted on a shaft 127, rotatably mounted in bearings 128. This endless belt 122 leads upwardly from under the stamping end of the apparatus and delivers the cakes of soap 119 directly to a standard automatic wrapping machine, not shown. The cakes of soap will be wrapped by this machine while hard, due to their super-cooled state, so that they will not be damaged during the wrapping process, and after leaving the wrapping machine they are immediately packed in boxes ready for shipment and will return to normal temperature after being placed therein.

In order to make sure that every cake of soap falls out of the buckets when said buckets are overturned, a transverse shaft 129 is rotatably mounted in bearings 130 secured to the vertical standards 87 and a U-shaped bracket 131 is secured to the shaft 129, said bracket having a spindle 132 secured between its legs 133 and 133ª, by means of split pins 134. A dog 135 is preferably arcuate in cross section and is provided at each end with an outstanding flange 136, each of which is rotatably mounted on the spindle 132. A lug 137 is formed on the leg 133 so as to abut one of the flanges 136 and limit the movement in one direction of the dog 135 about said spindle. Between one of the flanges 136 and the leg 133, a coil spring 138 is mounted on the spindle 132, one end of which engages said lug 137, and the other engages the dog 135 so that as the shaft 129 is rotated in a clockwise direction, as seen in Figure 4, the dog 135 will engage the edge of the cake of soap 119 and will be resiliently pressed thereagainst by said spring so that the cake of soap will be forced from the bucket. In order to rotate the shaft 129, a sprocket wheel 139 is secured to one end of said shaft and a chain 140 connects said sprocket wheel to a sprocket wheel 141 secured to the shaft 83.

For most of the laundry soaps, it will be sufficient to wrap the soap up and pack it in boxes while in a super-cooled state, without first drying it, but for some special types of soap, it may be desirable to dry the soap somewhat before wrapping it, and for this purpose a continuous and automatic mechanism is provided, as shown in Figures 11, and 13 to 22 inclusive. In Figure 11, the lower end of a chute 120ª terminates directly over a distributer 142 which has a shape in cross section similar to a cross having equal arms 143. This distributer 142 is secured at one end to a square shaft 144 and at the other end to a shaft 145 which may be circular in cross section and is rotatably and slidably mounted in a bearing 146. The square shaft 144 may be slidably mounted in a pair of bushings 147 which have square holes similar in shape to that of said shaft 144, and said bushings may be rotatably mounted in a pair of coaxial bearings 148 formed on a bracket 149. These bushings 147 are prevented from sliding out of the bearings 148 as the shaft 144 is reciprocated, by means of pins 150, which pass chordally through said bearings and engage annular grooves 151 formed one in each bushing, so that the latter will be free to rotate in said bearings, but will be prevented from moving axially. It is desired to reciprocate the distributer 142 axially, so as to receive the cakes of soap as they slide down the chute 120ª from the buckets and to rotate said distributer through one quarter of a revolution at each end of its stroke, so that the cakes of soap will be deposited on an endless drying belt 152 which is mounted on a roller 153 secured to a shaft 154, said belt serving to carry the cakes of soap slowly through the drying chamber to be hereinafter described.

In order to turn the distributer 142 through one quarter of a revolution at each end of its stroke, a collar 155 is slidably but not rotatably mounted on the square shaft 144 between the two bearings 148. A locking dog 156 is pivotally mounted at the top of each bearing 148 opposite the collar 155, by a pin 157 secured between flanges 158 formed on said bearings. A pair of diametrically opposite notches 159 are provided in each edge of the collar 155, so that each pair of notches is positioned at 90° to the other pair of notches on the other side of said collar. The inner end of one of the locking dogs 156 is adapted to engage one of the notches 159 so as to prevent the square shaft 144 from rotating and to hold the distributer 142 so that one of its arms 143 is horizontal to receive the cakes of soap as they slide down the chute 120ª. The end of each locking dog 156 opposite the collar 155, is formed into a fork 160, which partially surrounds the square shaft 144, and a collar 161 is secured to the end of the square shaft 144 while a collar 162 is secured to said square shaft between the bracket 149 and the distributer 142, so that when the distributer 142 is at one end of its stroke, the collar 162 will engage one of the forks 160 and trip the locking dog 156 so that it is disengaged from the notch 159, thus allowing the square shaft 144 to rotate through one-quarter of a revolution due to the weight of the cakes of soap, and the row of cakes will then drop onto the endless belt 152, which carries them into the drying chamber. A similar procedure will take place when the distributer 142 is at the other end of its stroke in which case the collar 161 will strike the other fork 160, thus allowing the distributer to again turn through one-quarter of a revolution and drop the row of cakes onto the other side of the endless belt 152, as shown in Figure 14. When rotated exactly one-quarter of a revolution the other locking dog which has been sliding on the collar 155 as the latter rotates, catches one of the notches 159 and holds the distributer securely in its new position with one of the arms 143 horizontal. In order to press the locking dog resiliently against the collar 155, a coil spring 163 is mounted on each pin 157 so as to engage the fork 160 and the flange 158.

In order to provide means for placing the cakes of soap 119 evenly on the horizontal arm 143 of the distributer 142, a shield 164 is secured to a shaft 165, and said shaft is rotatably mounted at one end in a bearing 166 formed on the bracket of the bearing 146, and at the other end in a bearing 167 formed on the bracket 149. The end of the shaft 165 adjacent the collar 155 is secured to a collar 168 on which is formed a lug 169, which normally bears against the periphery of the collar 155, and a weight 170 is formed on the collar 168 so that the lug 169 will be pressed against the periphery of said collar 155. When the distributer 142 turns through one quarter of a revolution at the end of its stroke, it is necessary for the lower side of the shield 164 to swing outwardly with the shaft 165, and for this purpose four studs 171 are secured to said collar 155 between the notches 159, each positioned at 90° to the adjacent stud, and when the collar 155 is rotated with the square shaft 144, one of these studs will engage the lug 169 thus tipping the shield 164 outwardly into the position shown in dotted lines in Figure 11, so that the cakes of soap will drop correctly positioned on edge on the endless belt 152. One or more safety collars 172 may be secured to the shaft 165 to prevent it from moving axially.

The mechanism which reciprocates the distributer 142 axially as shown in Figures 13ª, 21, and 22, consists in a rack 173 which is in the shape of a flattened ellipse with parallel sides and semi-circular ends. This rack is provided on its lower side with a base 174 supported on a table 175 so that said rack may be reciprocated on said table. A groove 176 is formed in said base inside said rack, similar in shape but smaller than said rack and is adapted to slidably and rotatably receive the lower end of a vertical shaft 177. A gear 178 is secured to the lower end of this shaft just above the base 174 so that its teeth will engage the teeth of the rack 173. The shaft 177 is rotatably mounted in a bearing 179 which is secured to any suitable frame work such as a horizontal channel strip 180. This channel strip may be supported at its ends by means of vertical standards 181 and a horizontal angle strip 182 may be secured to said channel strip and extends longitudinally abutting the upper surface of the rack 173 so as to hold said rack correctly positioned with respect to the table 175, the end of said angle strip 182 being secured to a vertical supporting standard 183. The table 175 may be supported by a plurality of brackets 184. An arm 185 is formed on the end of the rack 173 adjacent the distributer 142 and said arm is pivotally connected in a forked end 186 formed on a swivel box 187, by means of a pin 188 held in place by any suitable means, such as a split pin 189. The swivel box 187 is provided with elliptical shaped flange 190 secured by bolts 191 to a cover 192. The shaft 145 extends through a centrally located hole in the cover 192 and is provided inside said cover with a collar 193 secured to said shaft by a pin 194, said collar being rotatably mounted in a circular recess in the swivel box 187. Thus when the shaft 177 is rotated, the lower end of said shaft will follow the groove 176, thus holding the teeth of the gear 178 in contact with the teeth of the rack 173, so that said rack will be reciprocated with a slight dwell in the motion of the distributer at the end of each stroke. In reciprocating, the rack will turn about the pin 188 and at each end of the stroke the shaft 145 will rotate through one quarter of a revolution since the collar 193 will rotate in the swivel box 187. In order to rotate the shaft 177, a bevel pinion 195 is secured to the upper end of said shaft and a bevel gear 196 engages said pinion and is secured to the end of a shaft 197. This shaft is supported in bearings 198 and 199, the latter of which is secured to the horizontal beam 86. The bearing 198 also serves to support the upper end of the shaft 177 and is secured to any suitable frame work 198ª. A spur pinion 200 is mounted on said shaft 197 adjacent the bearing 199, and engages a spur gear 201, mounted on a shaft 202 on which is also mounted a bucket sprocket wheel on the stamping end of the apparatus.

A shaft 203 on which the bucket sprocket wheel is mounted at the crutcher end of the apparatus is provided on one end with a bevel pinion 204 which engages a bevel gear 205 secured to the vertical shaft 206. The shafts 203 and 206 are mounted in any suitable bearings 207 supported on frame work 208, and a bevel pinion 209 is mounted on the lower end of said shaft 206. The pinion 209 engages a bevel gear 210 which is mounted on the end of a shaft 211 carrying a roller 212 on which is mounted the endless belt 152 which is supported at the stamping end of the apparatus by roller 153 and is preferably perforated or constructed of slats for the free circulation of air. A chute 213 is mounted on brackets 214 adjacent the roller 212, and the lower end of the chute 213 has a vertical portion 215 which terminates directly over an endless belt 216 which moves at right angles to the drying belt 152. As the cakes of soap 119 are delivered from the endless belt 152, as said belt passes around the roller 212, the cakes slide down the chute 213 and are deposited on the endless belt 216. A shield 217 is supported on brackets 218 so as to be positioned directly above the endless belt 216 and on the side of said belt opposite the vertical member 215, so that as said cakes of soap slide down the chute 213 they will strike said shield and be deflected downwardly so as to land on edge on said endless belt 216. The endless belt 216 is supported on rollers 219 and leads to an automatic wrapping machine, not shown, where the wrappers are placed on the cakes of soap after which they are packed in the boxes ready for shipment.

A drying chamber having vertical sides 220 and a top 221, surrounds the cakes of soap as they are carried on the endless belt 152, and said chamber terminates on the end adjacent the roller 212, in an air duct 222 into which warm, dry air may be forced by a fan or blower not shown, in order to accomplish the drying of the soap as it travels through said drying chamber. Any suitable outlet, not shown may be provided for the air on the other end of the drying chamber adjacent the roller 153 so that the air preferably moves countercurrent to the motion of the cakes of soap, thus insuring a maximum drying efficiency. As the warm air passes through the drying chamber it will have a tendency to become cool, due to the heat lost by the evaporation of the moisture from the soap, and in order to maintain the temperature of the air substantially constant as it travels through said drying chamber, a plurality of steam pipes 223 is positioned between the runs of the endless belt 152 and steam is introduced into a header 224 on the end of said steam pipes adjacent the roller 153 so that the direction of flow of the steam is preferably countercurrent to that of the air. A rod 225 is transversely secured to the vertical sides 220 of the drying chamber and is so positioned that the cakes of soap 119 will strike said bar and fall backward so as to slide down the chute 213 on their broad surface.

In operation the liquid soap from one of the crutchers 40 is run into the pipe 45, through the pipe 43 by opening one of the valves 44, and said liquid soap runs from the pipe 45 into the chain of buckets 46 under a low pressure, due to the head of the column of soap, thus insuring that the buckets are completely filled. The soap is scraped level on top of the buckets by means of the plate 48 pressing resiliently against the top of said buckets due to the spring hinge 47. After the buckets are filled with the hot liquid soap they pass into the cooling chamber 51 which is surrounded by cold brine introduced through the intake pipe 58, said brine escaping out of the outlet pipe 59. The metal sides 61 of the buckets have several hundred times the thermal conductivity of the soap, so that the heat is quickly conducted away from between the cakes of soap, thus insuring that each cake is cooled uniformly on all sides so as to form a hard, outside surface suitable for stamping, wrapping and packing and equivalent to the "skin" which is formed on the cakes of soap at present by drying. The chain of buckets 46 is given an intermittent motion by means of the disc 81 carrying the arm 84 and secured to the shaft 83, which rotates continuously. The disc 81 consecutively engages the semi-circular recesses 80 in the scalloped flange 79 and as said arm 84 is rotated it engages the outer end of the adjacent rod 69, thus moving the bucket chain 46 the length of another bucket. The shaft 83 is rotated continuously by means of the gear 88 engaging the pinion 89, said pinion being secured to a shaft 90 on the other end of which is secured the pulley 93 and the belt 96 connects the pulley 93 to a pulley 94 of the motor 95. The stamping die 98 is positioned above the chain of endless buckets 46 and is secured to the end of the rod 99, which is reciprocated vertically by means of the lever 103 pivoted at 104 and having a weight 118 suspended from its opposite end. The lever 103 is rocked about its pivot 104 by means of the cam 110 secured to the shaft 111 which is rotated by means of the chain 111$^a$ operated from the shaft 83. As the bucket chain 46 moves around the sprocket wheel the cakes of soap 119 will usually fall out of the buckets onto the chute 120 of their own weight and slide down said chute, landing on the endless belt 122, which carries them directly to the automatic wrapping machine. In case any of the cakes of soap cling to the buckets, the dog 135 mounted on the bracket 131, engages the edge of the cake of soap as the shaft 129 rotates and is pressed resiliently thereagainst by means of the spring 138, associated with said dog. The shaft 129 is rotated continuously by the chain 140 operated from the shaft 83.

Thus it is seen that the process of manufacturing soap as now practiced, which includes the steps of (a) framing, (b) stripping, (c) slabbing, (d) cutting, (e) drying, and (f) stamping, and which occupies a period of at least three weeks may be reduced by my improved process and apparatus to a period of less than one hour by leaving out the steps (a) framing, (b) stripping, (c) slabbing, (d) cutting, and (e) drying, of the process. The soap is also handled automatically with a minimum labor cost, is cooled in small masses thereby greatly reducing the cooling time, produces a better quality of soap due to its homogeneity, produces no scrap soap which would necessitate re-working at additional expense and eliminates the interest charge now necessary on the large amount of capital invested in soap stock and machines necessary in the present process.

If it is desired to dry a special type of soap, the distributer 142 is placed below the chute 120$^a$ and said distributer is reciprocated back and forth under said chute by means of the gear 178, which engages the elliptical rack 173. The gear 178 is mounted on the shaft 177 which is rotated by means of the bevel pinion 195 meshing with the bevel gear 196 mounted on the shaft 197, which in turn is continuously rotated by means of the pinion 200 meshing with the gear 201 mounted on the shaft 202. When either of the collars 161 or 162 on the square shaft 144 engage one of the forks 160 on the dogs 156 at one end of the stroke of said distributer, said dog is disengaged from the notch 159, thus allowing the distributer to rotate through one quarter of a revolution so as to drop its row of cakes onto the endless drying belt 152. The two chains of buckets 46 are preferably so timed as to deliver the cakes of soap alternately, to the distributer as it reciprocates. The shield 164 which is mounted on the shaft 165, is tipped outwardly by means of one of the studs 171 engaging the lug 169 when said distributer turns through one quarter of a revolution so that the cakes of soap will fall correctly positioned on edge on the endless belt 152. As the cakes of soap are carried to the drying chamber by the endless belt 152, warm air is introduced into the air duct 222 so as to flow in a direction countercurrent to the movement of the cakes of soap. Steam is passed through the steam pipes 223 in a direction countercurrent to the direction of flow of the air so that the air is maintained at a substantially constant temperature as it passes through said drying chamber. The roller 212 supporting the endless belt 152 opposite the roller 153 is rotated by the bevel gear 210 mounted on the shaft 211 and meshing with the bevel pinion 209, mounted on the shaft 206. A bevel gear 205 is mounted on the upper end of the shaft 206, meshing with a bevel pinion 204 mounted on shaft 203. As the cakes of soap are delivered from the endless belt 152, they slide down chute 213 onto the endless belt 216 which carries them through the side of the drying chamber to the wrapping machine where the wrappers are put on, after which the cakes of soap are packed in boxes. It is only necessary under favorable drying conditions provided by this machine to dry the soap for one or two hours to give a skin sufficiently thick.

Any number of bucket chains and drying apparatuses may be operated simply by extending the shaft 83, 111, 129, 145, 154, 203, etc., without increasing the amount of mechanism required for the small apparatus as shown. While the drying apparatus is designed primarily to act in conjunction with my improved cooling apparatus and is operated from and timed therewith, it may also be used for drying any other articles or substances without the use of the cooling apparatus.

I would state in conclusion that while the illustrated examples constitute a practical embodiment of my invention, I do not limit myself strictly to the details herein illustrated since manifestly the same can be considerably varied without departing from the spirit of the invention as defined in the appended claims.

Having thus described my invention I claim as new and desire to secure by Letters Patent:

1. In an apparatus for the manufacture of soap and the like, an endless chain of interlocking buckets having the bottom on one bucket extending between the sides of the adjacent bucket adapted to receive hot liquid soap, means for supplying hot liquid soap to said buckets, means for cooling and solidifying the soap in said buckets, and means for transferring said cakes of cold soap from said buckets to a discharge point.

2. In an apparatus for the manufacture of soap and the like, an endless chain of buckets adapted to receive hot liquid soap, means for supplying hot liquid soap to said buckets, means for cooling and solidifying the soap in said buckets, and means for stamping the cold soap while in said buckets.

3. In an apparatus for the manufacture of soap and the like, an endless chain of interlocking buckets having the bottom on one bucket extending between the sides of the adjacent bucket, means for moving said endless chain of buckets with an intermittent motion, means for supplying hot liquid soap to said buckets, means for cooling and solidifying the soap in said buckets, and means for ejecting the cakes of cold soap from said buckets.

4. In an apparatus for the manufacture of soap and the like, an endless chain of buckets, means for moving said bucket chain with an intermittent motion, means for introducing hot liquid soap into said buckets, means for cooling and solidifying the soap in said buckets, means for stamping the soap in said buckets during a dwell in the intermittent motion thereof, and means for transferring the cold cakes of soap from said buckets to a discharge point.

5. In an apparatus for the manufacture of soap and the like, an endless chain of interlocking buckets having the bottom on one bucket extending between the sides of the adjacent bucket, means for moving said bucket chain with an intermittent motion, means for introducing hot liquid soap into said buckets, means for cooling and solidifying the soap in said buckets, means for extracting the cakes of soap from said buckets during a dwell in the intermittent motion thereof, and means for moving the extracted soap to a discharge point.

6. In an apparatus for the manufacture of soap and the like, an endless chain of buckets, means for moving said bucket chain with an intermittent motion, means for introducing hot liquid soap into said buckets, means for cooling and solidifying the soap in said buckets, means for stamping the soap in a bucket during a dwell in the intermittent motion thereof, means for extracting a cake of soap from a bucket during said dwell, a drying chamber, means for passing the cakes of soap through said drying chamber after they are extracted from said buckets, and means for transferring said dried cakes of soap to a discharge point.

7. A device as described in claim 6, characterized by an endless drying conveyor, means for moving said endless conveyor through said drying chamber, and means for distributing said cakes of soap the full width of said drying conveyor after they are extracted from said buckets.

8. In an apparatus for the manufacture of soap and the like, a crutcher, an endless chain of buckets, means for transferring hot liquid soap from said crutcher to said endless chain of buckets, means for pressing said hot liquid soap into said buckets, means for moving said endless chain of buckets, means for cooling and solidifying the soap in said buckets as it is moved, means for stamping the soap in said buckets after it is cooled, and means for transferring the cold cakes of soap from said buckets to a discharge point.

9. In an apparatus for the manufacture of soap, and the like, an endless chain of buckets, the side wall of each bucket also serving as a side wall of an adjacent bucket, the bottom of each bucket being removable and secured to the side wall of the adjacent bucket, means for pivotally connecting said buckets, a plurality of sprocket wheels adapted to receive said endless chain of buckets, means for rotating one of said sprocket wheels so as to cause the movement of said endless chain of buckets, means for introducing hot liquid soap into said chain of buckets, and means for cooling and solidifying the soap in said buckets as said chain is moved so as to form cakes.

10. A device as described in claim 9, characterized by inscriptions formed on each bucket adapted to form an imprint of said inscription on the cakes of soap.

11. A device as described in claim 10, characterized by buckets the size of a hand cake of soap, said cake having its broad surface adjacent the bottom of each bucket.

12. In an apparatus for the manufacture of soap and the like, an endless chain of buckets, a plurality of sprocket wheels adapted to receive said endless chain of buckets, means for rotating one of said sprocket wheels so as to move said endless chain of buckets intermittently, means for introducing hot liquid soap into said buckets, means for cooling and solidifying the soap in said buckets to form hand cakes, means for stamping the cakes of soap in said buckets after said cakes are cooled, and means for transferring said cakes of soap from said buckets to a discharge point after said cakes are stamped.

13. A device as described in claim 12, characterized by a plurality of rods secured around the periphery of each sprocket wheel, the walls of said buckets being provided with recesses, each of said rods being adapted to engage the recesses of a bucket so as to move said chain of buckets as said sprocket wheel is rotated, one of said sprocket wheels being provided with a plurality of semi-circular recesses around its periphery, a shaft, a disc mounted on said shaft and adapted to engage one of said recesses, an arm associated with said disc adapted to engage one of said rods as said shaft is rotated so as to cause the intermittent rotation of said sprocket wheel, and means for rotating said shaft.

14. In an apparatus for the manufacture of soap and the like, an endless chain of buckets, means for introducing hot liquid soap into said buckets, a cooling chamber, means for moving said endless chain of buckets through said cooling chamber to form cakes, means for passing a cooling medium through said cooling chamber in a direction opposite to the direction of movement of said buckets, means for stamping the soap in said buckets after it is cooled, and means for transferring the cooled cakes of soap from said buckets to a discharge point after it is stamped.

15. In an apparatus for the manufacture of soap and the like, an endless chain of buckets, means for introducing hot liquid soap into said buckets, means for moving said buckets with an intermittent motion, means for cooling the soap in said buckets as it is moved to form cakes, a die, an inscription formed on said die, and means for moving said die and pressing it against a cake of the cooled soap in a bucket during a dwell in the intermittent motion of said bucket, so that the imprint of the die inscription will be pressed into the cake of soap.

16. A device as described in claim 15 characterized by a rod secured at one end to said die, a pivotally mounted lever pivoted to the other end of said rod, a weight secured to the end of said lever opposite said rod, and means for rocking said lever about its pivot so as to reciprocate said rod.

17. A device as described in claim 16 characterized by a shaft, a cam secured to said shaft adjacent said lever adapted to rock said lever about its pivot as the shaft is rotated, and means for rotating said shaft.

18. In an apparatus for the manufacture of soap and the like, an endless chain of buckets, a plurality of sprocket wheels adapted to receive said bucket chain, means for rotating one of said sprocket wheels with an intermittent motion, means for introducing hot liquid soap into said buckets, means for cooling said soap to form cakes, a shaft, a bracket secured to said shaft, a dog pivotally mounted on said bracket adapted to engage the face of a cake of soap during a dwell in the intermittent motion of said chain of buckets, so as to extract said cake of soap from said bucket as said shaft is rotated, spring means associated with said bracket adapted to resiliently press said dog against the face of said cake of soap, means for rotating said shaft, a chute adapted to receive said cakes of soap as they are extracted from said buckets, an endless conveyor adapted to receive the cakes of soap as they slide down said chute, and means for moving the endless conveyor so as to deliver said cakes of soap to a discharge point.

19. In an apparatus for the manufacture of soap and the like, an endless chain of buckets, a plurality of sprocket wheels adapted to receive said bucket chain, means for rotating one of said sprocket wheels with an intermittent motion, means for introducing hot liquid soap into said buckets as they are moved, means for cooling said soap to form cakes, means for stamping said soap after it is cooled during one of the dwells in the intermittent motion of said buckets, a shaft, means for rotating said shaft, means associated with said shaft adapted to disengage a cake of soap from a bucket during a dwell in the intermittent motion of said chain of buckets, and means for transferring said cakes of soap to a discharge point after they are disengaged from said buckets.

20. In an apparatus for the manufacture of soap and the like, an endless chain of buckets, means for introducing hot liquid soap into said buckets, means for cooling and solidifying the soap in said buckets, means for moving said chain of buckets, means for stamping said soap after it is cooled, means for disengaging a cake of soap from a bucket, a chute adapted to receive said cakes of soap after they are disengaged, an endless conveyor adapted to receive said cakes of soap as they slide down said chute, said endless conveyor being adapted to carry said cakes of soap to a discharge point, and means associated with said chute for causing said cakes of soap to be deposited on edge on said endless conveyor.

21. In an apparatus for the manufacture of soap and the like, an endless chain of buckets, means for moving said bucket chain, means for introducing hot liquid soap into said buckets, means for cooling the soap in said buckets to form cakes, means for stamping the soap in said buckets, means for extracting the cakes of soap from said buckets, a chute adapted to receive said cakes of soap after they are extracted from said buckets, a distributer associated with said chute being cross shaped in cross section, a shaft supporting said distributer, one of the arms of said distributer being so positioned as to receive the cakes of soap as said cakes slide down said chute, means for reciprocating said distributer axially, an endless drying conveyor, means associated with said chute adapted to cause the rotation of said distributer through a fraction of a revolution at the end of each stroke of said distributer so as to deposit said cakes of soap on said endless drying conveyor over a wide area thereof, a drying chamber, and means for moving said endless conveyor and said cakes of soap through said drying chamber.

22. In an apparatus for the manufacture of soap and the like, an endless chain of buckets, means for moving said bucket chain, means for introducing hot liquid soap into said buckets, means for cooling the soap in said buckets so that said soap is solidified, means for extracting the cakes of soap from said buckets, a chute adapted to receive said cakes of soap after they are extracted from said buckets, a distributing element associated with said chute adapted to receive said cakes of soap as they slide down said chute, means for reciprocating said distributing element axially, an endless drying conveyor, means for causing the rotation of said distributing element through a fraction of a revolution at each end of its stroke so as to deposit said cakes of soap on said endless drying conveyor over a wide area thereof, a drying chamber, and means for moving said endless conveyor and said cakes of soap through said drying chamber.

23. A device as described in claim 22, characterized by an elliptical shaped gear rack pivotally connected to said distributing element, a pinion having teeth adapted to engage the teeth of said gear rack so as to cause the reciprocation thereof when said pinion is rotated, and means for rotating said pinion.

24. A device as described in claim 22, characterized by a square shaft secured to said distributing element, a pair of bushings adapted to slidably receive said square shaft, a bearing adapted to rotatably receive each of said bushings so as to allow the rotation of said square shaft, a collar slidably mounted on said square shaft between said bearings, a locking dog pivotally mounted on each bearing adapted to engage said collar so as to prevent the rotation of said shaft, and means for causing said dogs to be disengaged from said collar at each end of the stroke of said distributing element so as to allow the rotation of said distributing element through a fraction of a revolution.

25. A device as described in claim 24, characterized by a shield rotatably mounted adjacent said distributer, adapted to cause said cakes of soap to be deposited on edge on said distributer, and means associated with said shield and said collar adapted to tip the lower side of said shield outwardly from said cakes of soap as said distributer is rotated, so as to cause said cakes of soap to be deposited on edge on said drying conveyor.

26. In an apparatus for the manufacture of soap and the like, an endless chain of buckets, means for moving said bucket chain, means for introducing hot liquid soap into said buckets, means for cooling the soap in said buckets to form cakes, means for extracting the cakes of soap from said buckets, a drying chamber, an endless drying conveyor, means for distributing the cakes of soap over a wide area of said conveyor after said cakes are extracted from said buckets, means for moving said endless drying conveyor and said cakes of soap through said drying chamber, an endless conveyor adapted to receive the dried cakes of soap from said drying conveyor, and means for moving the last mentioned endless conveyor so as to deliver said dried cakes of soap to a discharge point.

27. In an apparatus for the manufacture of soap and the like, an endless chain of buckets, means for moving said bucket chain, means for introducing hot liquid soap into said buckets, means for cooling the soap in said buckets to form cakes, means for stamping the soap in said buckets after it is cooled, means for discharging the cakes of soap from said buckets, an endless drying conveyor, a drying chamber, means for depositing said cakes of soap on said drying conveyor after said cakes are discharged from said buckets, means for moving said endless conveyor carrying the cakes of soap through said drying chamber in one direction, and means for passing a current of air through said drying chamber in a direction opposite to the direction of motion of said cakes.

28. A device as described in claim 27, characterized by a plurality of pipes positioned in said drying chamber, and means for passing a heating medium through said pipes in a direction of flow opposite to that of said air.

29. In an apparatus for the manufacture of substances which are liquid when hot but solidify on cooling, a cooling chamber, a plurality of containers, means for introducing the hot liquid substances into said containers, means for moving said containers through said cooling chamber so that said substance will be super-cooled to a temperature below 25° C. so as to form cakes of the substance, means for stamping the cakes in said containers after they are super-cooled, and means for discharging said cakes from said containers.

30. In an apparatus for the manufacture of soap and the like, a cooling chamber, a plurality of containers, means for introducing hot liquid soap into said containers, means for moving said containers through said cooling chamber so that said soap will be super-cooled to a temperature below 25° C. so as to form cakes of soap, means for stamping the cakes in said containers after they are super-cooled, means for discharging said cakes from said containers, and means for transferring said discharge cakes of soap to a discharge point.

31. In an apparatus for the manufacture of soap and the like, a plurality crutchers, a pipe connecting said crutchers, a plurality of endless chains of buckets, a plurality of pipes adapted to convey hot liquid soap from said crutchers to said endless chains of buckets, means for pressing said hot liquid soap into said buckets, said means also serving to fill the buckets with said hot liquid soap level with the tops thereof, means for moving said endless chain of buckets, means for cooling the soap in said buckets so as to form cakes, and means for discharging the cakes of soap from said buckets.

32. In an apparatus for the manufacture of soap and the like, an endless chain of buckets, means for moving said bucket chain, means for introducing hot liquid soap into said buckets, means for cooling the soap in said buckets to form cakes, means for discharging the cakes of soap from said buckets, an endless drying conveyor, a drying chamber, means for depositing said cakes of soap on said drying conveyor after said cakes are discharged from said buckets, means for moving said endless conveyor carrying the cakes of soap through said drying chamber in one direction, and means for passing a current of air through said drying chamber in a direction opposite to the direction of motion of said cakes.

33. An apparatus for the manufacture of soap and the like comprising a series of interlocking buckets having the bottom on one bucket extending between the sides of the adjacent bucket, means for supplying hot liquid soap to said buckets, means for cooling the soap in said buckets to a solid form, and means for discharging said soap from said buckets after cooling thereof.

34. An apparatus for the manufacture of soap and the like comprising a series of interlocking buckets having the bottom on one bucket extending between the sides of the adjacent bucket, means for supplying hot liquid soap to said buckets, cooling means, and means for moving said buckets past said cooling means so as to cool and solidify the soap in said buckets.

35. An apparatus for the manufacture of soap and the like, comprising means for receiving hot liquid soap, means for forming said soap into small portions, cooling means, means for moving said small portions past said cooling means for cooling and solidifying said soap, and means for stamping inscriptions on said portions while in said receiving means.

36. In an apparatus for the manufacture of soap and the like, a series of buckets, means for moving said buckets with an intermittent motion, means for introducing hot liquid soap into said buckets, cooling means arranged adjacent the path of travel of said buckets, said cooling means acting to cool and solidify said soap, and means for stamping the soap after it has been cooled and solidified.

37. In an apparatus for the manufacture of soap and the like, an endless chain of buckets, means for moving said bucket chain with an intermittent motion, means for introducing hot liquid soap into said buckets, means for cooling and solidifying the soap in said buckets, means for extracting a cake of soap from a bucket during a dwell in the intermittent motion thereof, a drying chamber, and means for passing the cakes of soap through said drying chamber after they are extracted from said buckets.

38. In an apparatus for the manufacture of soap and the like, an endless chain of buckets, means for introducing hot liquid soap into said buckets, means for cooling and solidifying the soap in said buckets to form cakes, means for extracting said cakes from said buckets, an endless drying conveyor, means for depositing said soap on said conveyor, means for moving said endless conveyor through said drying chamber, and means for distributing said cakes of soap over the full width of said drying chamber after they are extracted from said buckets.

39. In an apparatus for the manufacture of soap and the like, an endless chain of buckets having the bottom on one bucket extending between the sides of the adjacent bucket, a plurality of sprocket wheels adapted to receive said chain of buckets, means for rotating one of said sprocket wheels, means for introducing hot, liquid soap into said buckets, and means for cooling and solidifying the soap in said buckets to form hand cakes.

40. In a molding apparatus, a series of interlocking molds having the bottom of one mold extend between the sides of the adjacent molds, means for supplying a hot, liquid substance to said molds, means for cooling the liquid in said molds to form solid cakes, and means for discharging said cakes from said molds.

41. In a molding apparatus, an endless chain of molds, means for supplying a hot, liquid substance to said molds, means for cooling the liquid in said molds to form solid cakes, and means for discharging a cake from said molds when one mold is moved relative to a second mold.

42. In an apparatus for the manufacture of soap and the like, a series of buckets, means for introducing hot, liquid soap into said buckets, a cooling chamber, means for moving said buckets through said cooling chamber to solidify the soap in said buckets, means for stamping an inscription on said solidified soap and means for passing a cooling medium through said cooling chamber in a direction opposite to the direction of movement of said buckets.

43. In an apparatus for the manufacture of soap and the like, an endless chain of buckets, means for introducing hot, liquid soap into said buckets, means for moving said buckets, means for cooling the soap in said buckets as they are moved to form cakes, a die, an inscription formed on said die, and means for moving said die and pressing it against a cake of cooled soap in a bucket so that the imprint of the die inscription is pressed into the cake of soap.

44. A device as described in claim 57, characterized by a rod secured at one end to said die, a pivotally mounted lever pivoted to the other end of said rod, a weight secured to the end of said lever opposite said rod, and means for rocking said lever about its pivot so as to reciprocate said rod and die.

45. A device as described in claim 58, characterized by a shaft, a cam secured to said shaft adjacent said lever adapted to rock said lever about its pivot as the shaft is rotated, and means for rotating said shaft.

46. In an apparatus for the manufacture of soap and the like, an endless chain of buckets, a plurality of sprocket wheels adapted to receive said bucket chain, means for rotating one of said sprocket wheels with an intermittent motion, means for introducing hot, liquid soap into said buckets, means for cooling said soap to form cakes, a shaft, a bracket secured to said shaft, a dog pivotally mounted on said bracket adapted to engage the face of a cake of soap during a dwell in the intermittent motion of said chain of buckets so as to extract a cake of soap from a bucket as said shaft is rotated, spring means associated with said bracket adapted to resiliently press said dog against the face of said cake of soap, and means for rotating said shaft.

47. In a molding apparatus, a series of molds adapted to receive a hot, liquid substance, means for cooling said liquid in said molds to form cakes, a shaft, a bracket secured to said shaft, a dog pivotally mounted on said bracket adapted to engage a face of a cake and extract said cake from a mold when said shaft is rotated, and means for rotating said shaft.

48. In a molding apparatus, an endless chain of buckets, a plurality of sprocket wheels adapted to receive said bucket chain, means for rotating one of said sprocket wheels so as to move said chain, means for introducing a hot, liquid substance into said buckets, means for cooling the liquid in said buckets to form cakes, means for stamping an inscription on the cakes in said buckets, a shaft, means for rotating said shaft, and means associated with said shaft adapted to disengage the cakes from said buckets as said shaft is rotated.

49. In an apparatus for the manufacture of soap and the like, an endless chain of buckets, means for moving said bucket chain, means for introducing hot, liquid soap into said buckets, means for cooling the soap in said buckets to form cakes, means for discharging the cakes of soap from said buckets, an endless drying conveyor, a drying chamber, means for depositing said cakes of soap on said drying conveyor after said cakes are discharged from said buckets, means for moving said endless conveyor carrying the cakes of soap through said drying chamber in one direction, and means for passing a current of air through said drying chamber in a direction opposite to the direction of motion of said cakes.

50. In an apparatus for the manufacture of soap and the like, a series of movable buckets, means for supplying hot, liquid soap to said buckets, means for cooling and solidifying said soap to form cakes, means for disengaging the cakes of soap from said buckets, a chute adapted to receive said cakes of soap after they are disengaged, a conveyor adapted to receive said cakes of soap as they move down said chute and move said cakes to a discharge point, and means associated with said chute for causing said cakes of soap to be deposited on edge on said conveyor.

51. In an apparatus for the manufacture of soap and the like, means for supplying soap in liquid form, means for forming said soap into cakes, an endless conveyor adapted to receive cakes of soap from said cake forming means, a drying chamber, means for moving said endless conveyor through said drying chamber, and means for forcing air through said drying chamber.

52. In a mold for casting substances which are liquid when hot, and solid when cold, an open mold with a bottom and four sides adapted to contain the hot liquid substance and the resulting cake of cold, solid substance, means for causing said cake to be freed from three sides of said mold when said mold is moved, and means associated with said mold for freeing said cake from the remaining side and bottom of said mold.

53. In a molding apparatus, a series of molds, means for introducing a hot, liquid substance into said molds, means for cooling the liquid substance in said molds to solid form, means for moving said molds, a stamping die bearing an inscription and arranged adjacent said molds, a lever connected to said die, and means for actuating said lever so as to cause said die to stamp inscriptions on the solid substance in said molds.

54. In a molding apparatus, a series of molds, means for introducing a hot, liquid substance into said molds, means for cooling the liquid substance in said molds to solid form, means for moving said molds, a stamping die bearing an inscription and arranged adjacent said molds, a lever connected to said die, means for actuating said lever so as to cause said die to stamp inscriptions on the solid substance in said molds, and means for extracting the solid substance from said molds.

55. In a molding apparatus, an endless chain of molds, means for introducing a hot, liquid substance into said molds, means for cooling the liquid substance in said molds to solid form, means for moving said molds, a stamping die bearing an inscription and arranged adjacent said molds, a lever connected to said die, means for actuating said lever so as to cause said die to stamp inscriptions on the solid substance in said molds, and mean for extracting the solid substance from said molds.

56. In a molding apparatus, a mold, a die bearing an inscription arranged adjacent said mold, means for introducing a hot, liquid substance into said mold, means for cooling said substance to solid form, and lever actuated means adapted to cause said die to stamp an inscription on the solid substance in said mold.

57. In a molding apparatus, means for receiving a hot, liquid substance and forming said substance into small portions, cooling means, means for moving said small portions past said cooling means for cooling and solidifying the substance, and means for stamping inscriptions on said small portions while in said receiving means.

58. In a molding apparatus, an endless chain of molds, a container adapted to receive a hot, fluid substance, a screw rotatably mounted in said container adapted to mix said substance, a jacket adjacent said container adapted to receive a fluid medium, said medium being adapted to modify the temperature of the substance in the container, means for moving said chain of molds, connecting means between said container and said molds adapted to introduce the fluid substance into said molds during the movement thereof, means for solidifying said fluid substance, and means for placing an inscription on said solidified substance.

59. In a molding apparatus, an endless chain of molds, a container adapted to receive a hot, fluid substance, a screw rotatably mounted in said container adapted to mix said substance, a jacket adjacent said container adapted to receive a fluid medium, said medium being adapted to modify the temperature of the substance in the container, means for moving said chain of molds, connecting means between said container and said molds adapted to introduce the substance into said molds during the movement thereof, means for cooling and solidifying the substance in said molds, means for placing an inscription on said solidified substance and means for extracting the solidified substance from said molds.

60. In a device of the class described, a series of molds, the bottom of each mold being separable from a plurality of side walls of said mold and secured to the side wall of the adjacent mold, means for introducing a hot, fluid substance into said molds, and means for cooling and solidifying the substance in said molds, and means for placing an inscription on said solidified substance.

61. In a molding machine, an endless chain of hingedly connected molds, each mold having a plurality of side walls, the bottom of each mold being separable from all but one of said side walls and connected to a side wall of the adjacent mold, a plurality of sprocket wheels adapted to receive said chain, means for rotating one of said sprocket wheels so as to cause the movement of said chain of molds, means for introducing a hot, fluid substance into said molds, and cooling means adapted to cool and solidify said substance to form solid cakes, said mold bottoms being adapted to partially disengage the cakes from the side walls of the mold as said chain passes around a sprocket wheel, and means for placing an inscription on said solidified substance.

62. In a molding machine, an endless chain of hingedly connected open molds having side walls and bottoms, each mold bottom separably extending between said side walls and being secured to the side wall of the adjacent bucket, a plurality of sprocket wheels adapted to receive said chain, means for rotating one of said sprocket wheels so as to move said chain, means for introducing a hot, fluid substance into said molds, cooling means adapted to cool and solidify the substance in the molds to form cakes, said mold bottoms being adapted to partially disengage the cakes from the side walls of the molds as said chain passes around a sprocket wheel, and means for causing the complete separation of said cakes from said molds, and means for placing an inscription on a cake of said substance.

63. In a device of the class described, an element adapted to be joined to other similar elements to form a series of molds for the reception and solidification of a hot, liquid substance, said element being provided with an advertising inscription adapted to form an imprint of said inscription on a surface said solidified substance, said imprint being adapted to convey a definite meaning, said mold being adapted to permit stamping an inscription on a second surface of said solidified substance.

64. In a molding apparatus, an endless chain of molds, means for introducing a hot, liquid substance into said molds, means for cooling and solidifying the substance in said molds to form cakes, means for placing an inscription on a cake, a plurality of sprocket wheels adapted to receive said chain, means for moving said chain around one of said sprocket wheels, the bottom of each mold being adapted to partially disengage the cakes from the molds as said chain passes around said sprocket wheel, and rotating means adapted to complete the separation of the cakes from the molds.

65. In a molding apparatus, a mold having two substantially parallel sides and a third side connecting said parallel sides, a bottom formed on said third side being oppositely disposed to said parallel sides, said bottom being adapted to fit between the parallel sides of a similar mold so as to form a receptacle suitable for receiving a hot, liquid substance and molding same into solid form the shape of the receptacle, means for hingedly connecting said similar molds, and an inscription formed on said bottom adapted to mold an imprint of said inscription on said solid substance.

66. In a molding machine, a series of molds, means for supplying a hot, liquid substance to said molds, means for solidifying the substance in said molds, means for placing an inscription on said solidified substance while in said molds, and means for extracting the solidified substance from said molds.

67. In a molding machine, means for receiving hot, liquid soap and solidifying said soap to cake form, said receiving means being adapted to mold an imprint of an inscription on a surface of said cake, means for stamping an inscription on a surface of said cake, and means for extracting said cake from said receiving means.

68. In a molding apparatus, an endless chain of die-cast molds, each mold having a plurality of side walls and a bottom separable from said side walls, said bottom being secured to the side wall of the adjacent mold, means for introducing a hot, fluid substance into said molds, means for cooling the substance in said molds to form solid cakes, and means for moving said chain so that said mold bottoms extract the cakes from said molds.

LEWIS A. PALEY.